July 20, 1943.     V. JACOBSON     2,324,706
METHOD AND MEANS FOR ACOUSTICAL TREATMENT
Filed Jan. 2, 1941     7 Sheets-Sheet 1
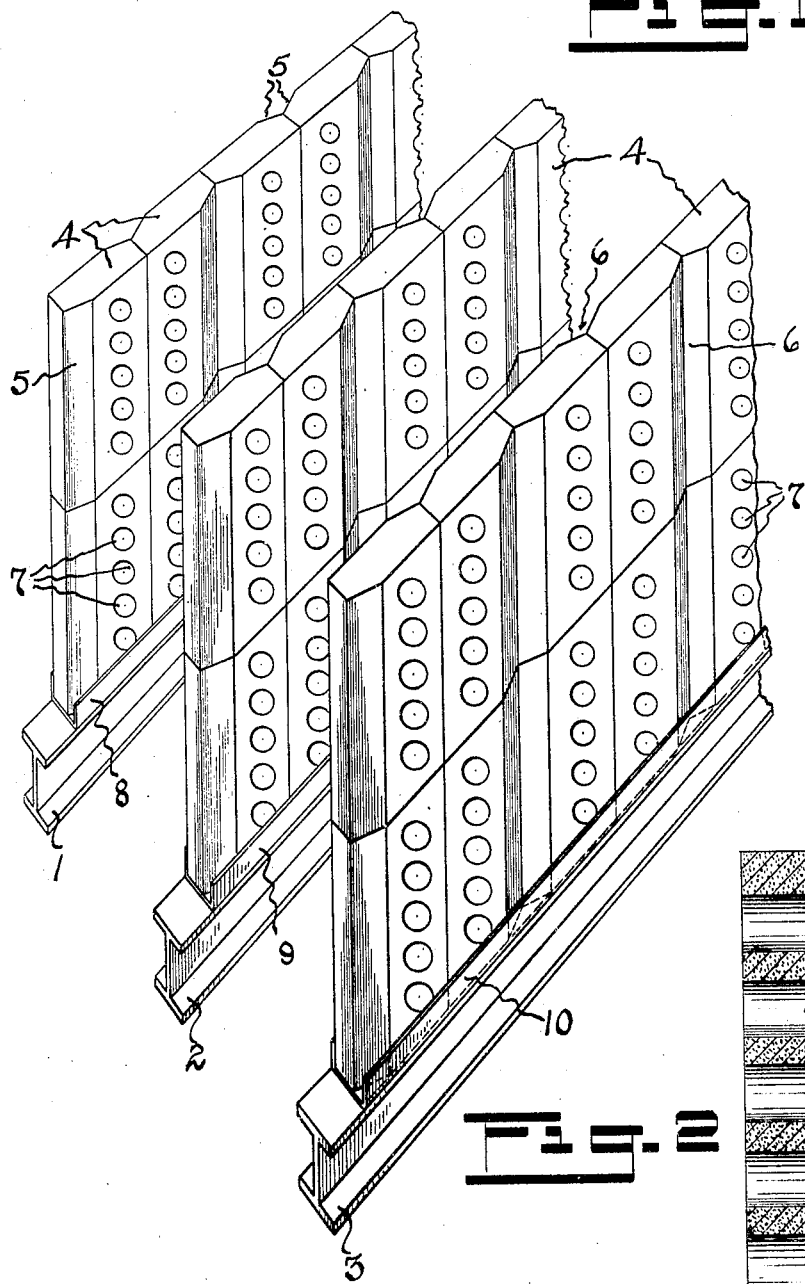
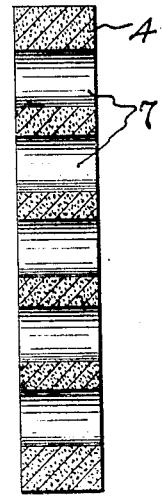
INVENTOR.
Victor Jacobson
BY
Atts.

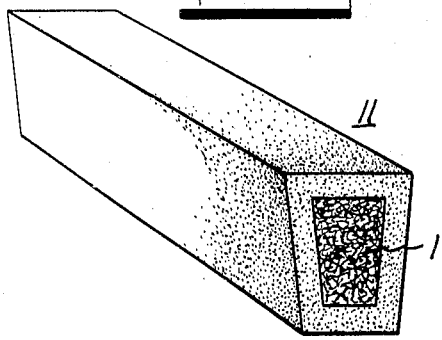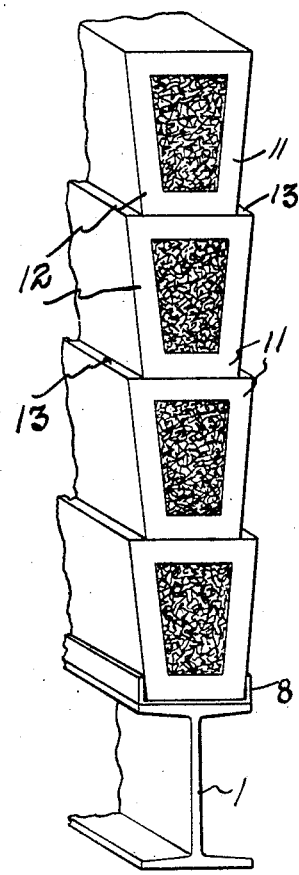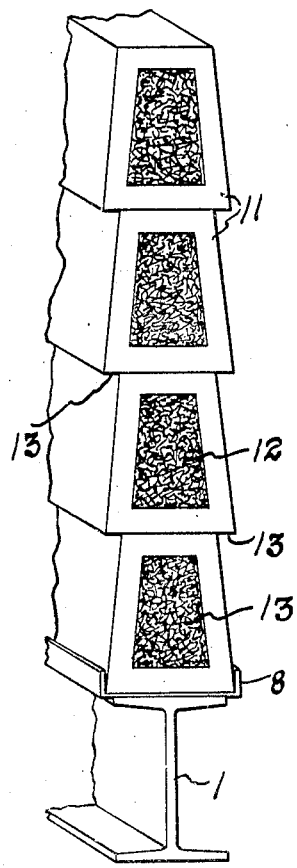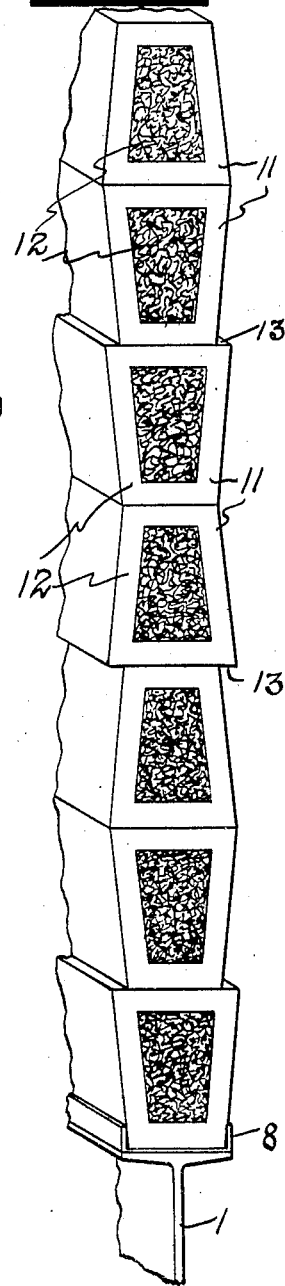

July 20, 1943.  V. JACOBSON  2,324,706

METHOD AND MEANS FOR ACOUSTICAL TREATMENT

Filed Jan. 2, 1941  7 Sheets-Sheet 3

INVENTOR.
Victor Jacobson

BY Danby & Danby
Atts.

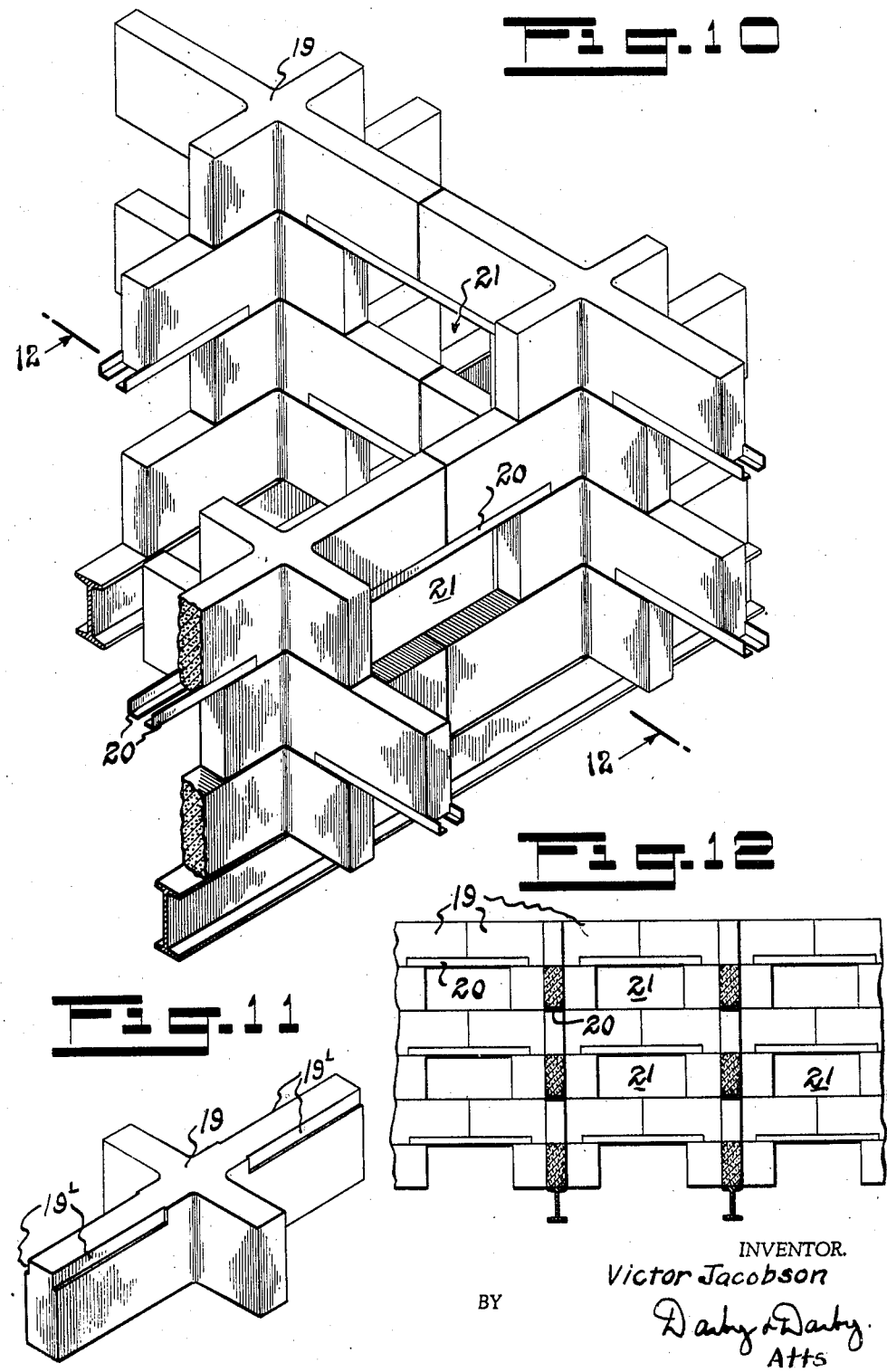

July 20, 1943. V. JACOBSON 2,324,706
METHOD AND MEANS FOR ACOUSTICAL TREATMENT
Filed Jan. 2, 1941 7 Sheets-Sheet 5
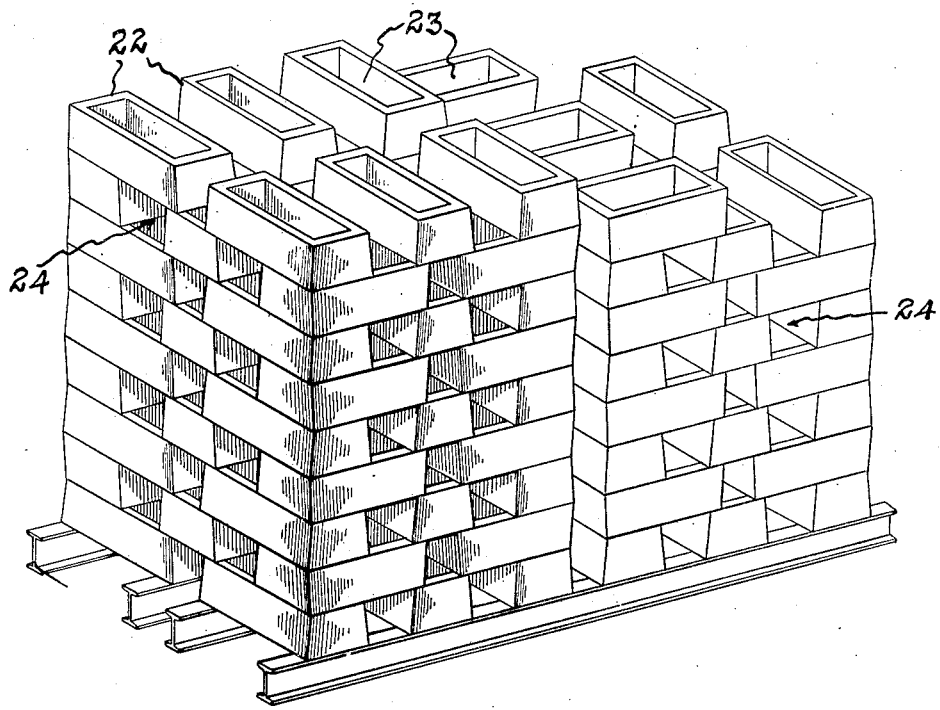
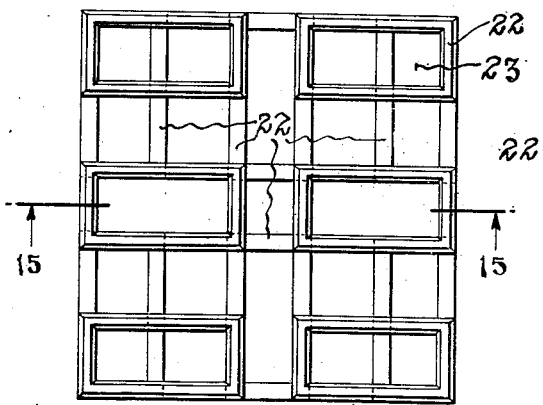
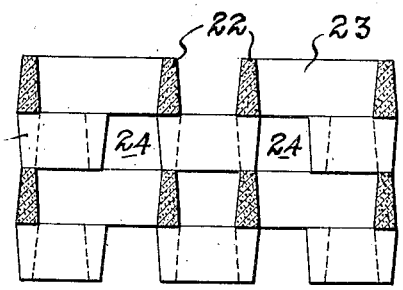
INVENTOR.
Victor Jacobson
BY
Darby + Darby
Atts July 20, 1943. V. JACOBSON 2,324,706
METHOD AND MEANS FOR ACOUSTICAL TREATMENT
Filed Jan. 2, 1941 7 Sheets-Sheet 6
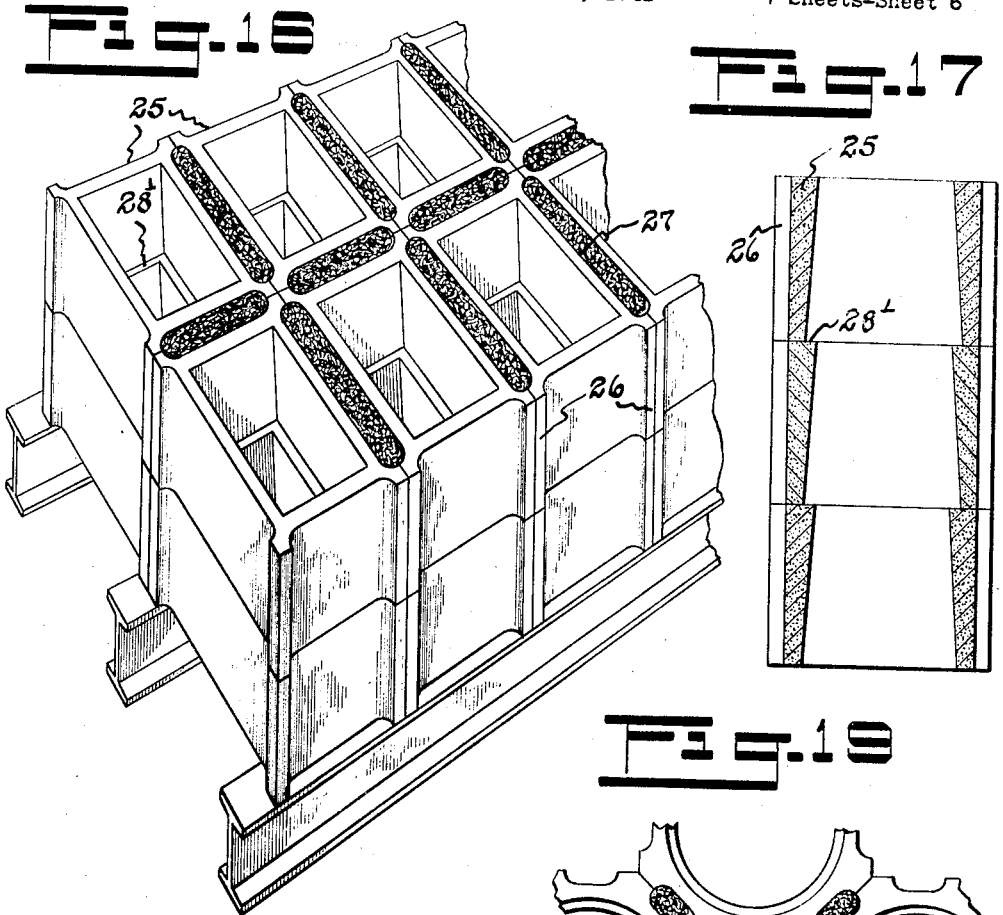
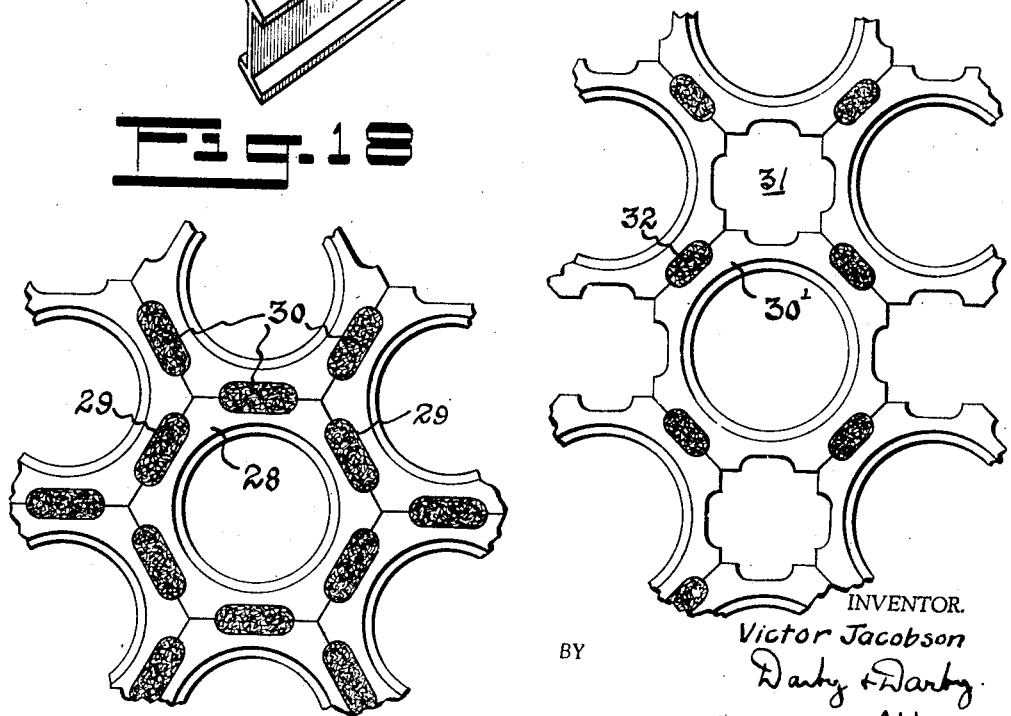
INVENTOR.
Victor Jacobson
Darby & Darby
Atts.

July 20, 1943.  V. JACOBSON  2,324,706
METHOD AND MEANS FOR ACOUSTICAL TREATMENT
Filed Jan. 2, 1941   7 Sheets-Sheet 7

INVENTOR.
Victor Jacobson
BY
Atts.

Patented July 20, 1943

2,324,706

UNITED STATES PATENT OFFICE 2,324,706

METHOD AND MEANS FOR ACOUSTICAL TREATMENT

Victor Jacobson, New Rochelle, N. Y., assignor to Jacobson & Company, Inc., New York, N. Y., a corporation of New York Application January 2, 1941, Serial No. 372,844

16 Claims. (Cl. 181—35)

This invention is directed to a method and construction for use in places where it is desired to rapidly attenuate and dissipate sound energy of high intensity.

General objects of this invention are to provide a method of absorbing and dissipating high intensity sound energy, and to employ sound absorbing material in various constructions so as to form sound absorbing labyrinths.

The many and detailed objects of this invention which are secured by means of the subject matter herein disclosed will become more apparent from the following detailed description of the various forms thereof.

This invention resides substantially in the combination, construction, arrangement and relative location of parts, all in accordance with this disclosure.

In the accompanying drawings,

Figure 1 is a view in perspective of one construction embodying the principles of this invention;

Figure 2 is a vertical, central, cross-sectional view through one of the elements of the construction;

Figure 3 is a perspective view of a modified form of sound absorbing element in accordance with this invention;

Figures 4, 5 and 6 represent, respectively, different methods of assembling elements of the form shown in Figure 3 to secure the results of this invention;

Figure 10 is a perspective view of still another construction employing an element similar to that of Figure 7 but differing in some respects;

Figure 11 is a perspective view of the element used in the construction of Figure 10;

Figure 12 is a cross-sectional view taken on the line 12—12 of Figure 10;

Figure 13 is a perspective view of still another modified form of structure employing a different structural form of element;

Figure 14 is a top plan view of a portion of the structure of Figure 13;

Figure 15 is a cross-sectional view taken on the line 15—15 of Figure 14;

Figure 16 illustrates in perspective a further modified structure;

Figure 17 is a vertical, cross-sectional view through a portion of this structure;

Figure 18 is a top plan view of another form of element and a structure which is built up therefrom;

Figure 19 is a plan view of still another form of element and the structure which may be built with it;

Figure 7:
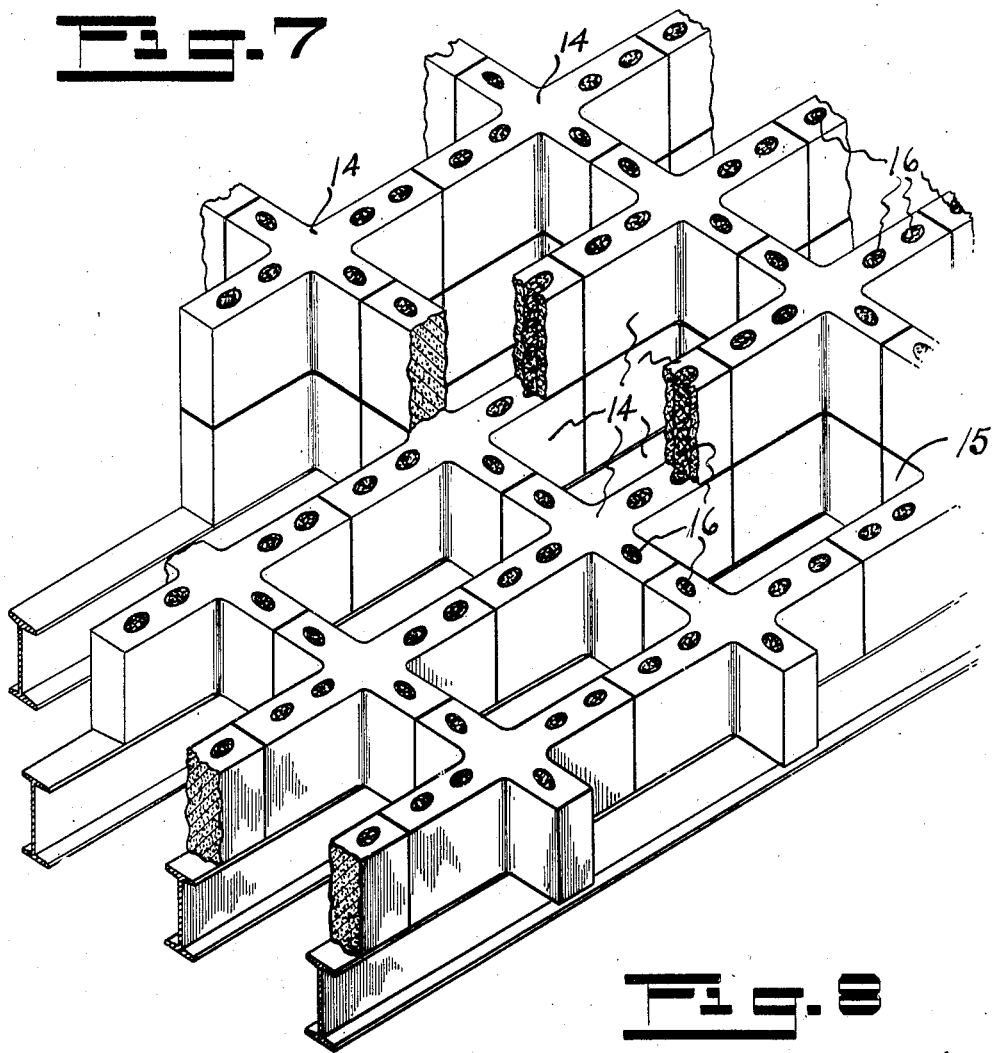
Figure 7 is a perspective view of a modified construction employing a different form of element.

In many factories and like places a considerable amount of noise is generated which it is desirable, and in many cases necessary, to attenuate as quickly and cheaply as possible so as not to be a source of annoyance in the areas adjacent thereto. An outstanding example of a source of undesirable high intensity noise is an airplane engine testing laboratory. Provision must be made to quiet the noise generated by the engines on test, and while at the present time a number of methods are employed none of them is sufficiently efficient and inexpensive. A number of high power airplane engines operating under test conditions generate noises of extremely high intensity, which include a considerable amount of energy in the low frequency waves. Experience has demonstrated that it is extremely difficult to attenuate these high intensity noises in an inexpensive manner. It is the object of this invention to provide an economically possible construction for dissipating and absorbing sound energy generated during the testing of airplane engines.

In accordance with present practice in this field the testing laboratories are provided with vertical towers or horizontal units which are used to provide means for introducing air into and discharging it from the testing laboratory for cooling purposes and to provide a location for sound absorbing materials introduced into the interior of these stacks to absorb and dissipate the sounds generated by the engine being tested. When vertical towers are employed they usually are arranged at opposite ends of the testing laboratory to form a U-shaped construction having a square base. The base or horizontal portion of the U-shaped building forms the testing laboratory, while one of the arms which is a vertical tower provides for the ingress of air and the other for the egress of air. In other constructions where horizontal tunnels are employed the laboratory is placed at the center and the aligned extensions or arms are in the form of tunnels, through one of which air is introduced into the laboratory and from the other of which it is discharged. It is also common for one stack to be vertical and the other horizontal in one engine test building. Extremely large volumes of cooling air are, of course, necessary to simulate the normal operating conditions in flight of the engines being tested so as to secure accurate indications of horsepower and other conditions of performance to be encountered in flight. The length of the towers and tunnels is desirably kept at a minimum for economic reasons. Furthermore, their length cannot usefully be extended to any considerable degree because the dissipation and absorption of sounds in them caused by sound absorbing materials when present does not increase in direct proportion to their lengths. A condition of diminishing returns is rather quickly reached. The use of stacks of unlimited heights or lengths is impracticable because there has been shown that little or no sound is absorbed in stacks wherein no sound absorbing materials have been introduced regardless of the heights or lengths of the stacks.

While there are known methods of providing acoustical treatment for these towers or tunnels involving the lining of the tunnel with sound absorbing material, none of these is entirely satisfactory. No other method of treatment which effectively absorbs the sound without unduly restricting the area of the tunnel is known. When it is realized that very large volumes of air at high velocity must travel through these tunnels, it will be apparent that the problem of providing proper acoustical treatment without too greatly impairing the flow of air through the tunnel is a difficult one. It is a further object of this invention to provide a construction for the acoustical treatment of towers and tunnels of this nature by which it is possible in an economical manner to absorb and dissipate the sound energy while aligning an adequate cross-sectional area for the proper flow of air therethrough.

In a general way the construction of this invention while allowing for the proper flow of air is of such nature as to cause multiple reflections of the sound waves. Since the sound absorbing media used can and do attenuate the sound that impinge on them, it is an object of this invention to cause a multiplicity of reflections of sound waves on the sound absorbing media and in this way, to attenuate the sound energy more quickly and economically.

As a factor in the dissipation of the sound energy, the construction, in addition to creating multiple reflection of the sound waves, causes them to break up into a multitude of eddies, thereby aiding in their rapid attenuation. The construction provides for a discontinuous path of travel of relatively great length with respect to the length of the tower in directions to cause the sound waves to repeatedly contact with the sound absorbing cavities and materials of the construction so that little, if any, of the sound energy is propagated from the tower or tunnel end.

In the drawings one form of construction in accordance with this invention is fully illustrated in Figures 1 and 2. At 1, 2 and 3 are shown beams which are illustrative only of one means for supporting the elements of this construction. Resting on the beams are the channel members 8, 9 and 10, respectively, in which the lower course of the elements 4 rest so as to extend vertically. While only two rows of these elements are shown supported by each beam and only three walls or partitions are illustrated, it is intended that the tower or tunnel shall have a sufficient number thereof to form from ten to fifteen passages or channels. It may be noted for the purpose of better appreciating the nature of the invention that commonly these towers or tunnels are about twenty feet square so that the channels formed by the partitions in the construction of these figures will be roughly a foot wide and extend entirely across the other dimension of the tunnel or tower.

The elements consist of sound absorbing bodies in the form, for example, of blocks 4 of some suitable form-sustaining material and in practice are preferably masonry blocks with controlled porosity. They can be moulded of a mixture which when it sets forms a relatively porous body having a multitude of surface cavities and being made up of a multitude of more or less unobstructed cells so that the sound waves will be directly absorbed therein. These bodies may be of various forms but for the sake of simplicity they will be referred to as blocks in the following description. These elements are formed so that an opposite pair of corners are absent to form inclined, vertically extending faces 5 so that when the blocks are horizontally aligned V-shaped channels 6 are produced which extend vertically, as clearly indicated in the figures. Each of the blocks, if desired, in order to increase its sound absorbing capacity, may be provided with a series of apertures 7 extending all the way through it.

A tunnel or tower provided with partitions constructed of these elements has been found to be very efficient in the absorption of sounds of high intensity in a tower of reasonable and practical length while not unduly restricting the capacity of the tower to handle large volumes of air at the correct velocity. The sound waves, when discharged into the base of a tower or the receiving end of a tunnel, encounter these partitions, and being scattered in all directions impinge upon the walls of the partitions, part of the energy is absorbed in the blocks themselves, part is absorbed in the passages 7 in the blocks, and part is reflected by the walls of the blocks. Some of this is reflected by the flat sides while the remainder is reflected by the inclined walls 5 of the V-shaped channels 6. The sound waves impinge on the walls from all directions and are likewise reflected in all directions. The relative irregularity of the walls multiplies the number of times that the direction of the sound waves is reversed so that in conjunction with the effects of absorption the sound waves are very rapidly dissipated.

Figures 3 to 6, inclusive, illustrate a modification of the invention. In this case the elements 11 from which the partitions are formed are, as before, preferably of an extremely porous construction but in cross-section are in the form of trapeziums. As illustrated in Figure 3, these blocks are formed with a longitudinal passage extending entirely therethrough which is packed with a suitable sound absorbing material, such as rock wool or other fibrous material, loose cinders, cork, and the like, as indicated at 12.

Figures 4, 5 and 6 illustrate different methods of assembling these blocks to form partitions which will divide the tower or tunnel into a plurality of vertical passages, as in the case of Figure 1.

In Figure 4 the blocks are shown mounted in vertical alignment and all positioned the same way so that the narrow bottom face rests on the wide face of the next row below it. In this position the inclined side walls extend in a more or less vertical direction. In this arrangement there are formed shoulders 13 at the top of each course which face upwardly with respect to the direction of travel of the sound. The tunnel or tower is provided with a proper number of partitions formed in this manner so that the proper quantity of air may move through the tunnel.

In the construction of Figure 5, it will be seen that the blocks 11 have been turned over so that the wide bottom face of one block rests on the narrow top face of the lower block. This forms the shoulders 13 which face downwardly with respect to the upward travel of the sound waves. The inclined side faces are again generally vertical but in this case converge upwardly rather than diverge upwardly, as in the case of Figure 4.

In the construction of Figure 6, the partitions are formed by placing the blocks in rows, as shown in that figure. Thus some of the side faces in the partition lie to one side of the vertical and others lie to the other side. With this arrangement it will be seen that there are shoulders 13 facing alternately in opposite directions. A tower or tunnel provided with a proper number of partitions constructed in accordance with any one of these figures forms faces inclined in various directions to increase the action of multiple reflection. The material of the walls is sufficiently porous so that some of the sound waves will go through them and be absorbed within the porous filling 12 thereof.

The construction of these figures differs from that of the previous construction in that the shoulders 13 form traps, so to speak, for the sound energy which is caused to eddy behind them and thus be dissipated. To state it another way, these shoulders are the direct cause of turbulence in the sound waves, which, of course, causes the rapid dissipation of the energy in them.

Figure 9:
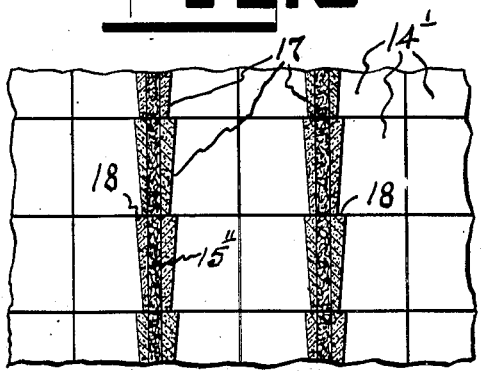
Figure 9 is a cross-sectional view of a structure similar to that of Figure 7 employing the modified element of Figure 8.
Figure 8:
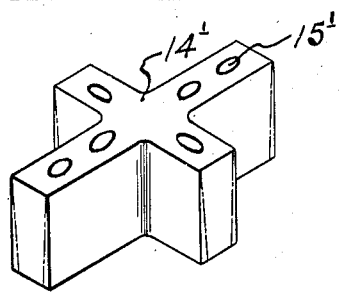
Figure 8 is a perspective view of one of the elements employed in the structure of Figure 7 and indicating thereon a method of modifying that element.

In the construction of Figure 7 the porous blocks 14 are in the form of crosses having a plurality of vertical passages therethrough in which sound absorbing packing 16 may be placed, such as that previously mentioned. At this point it can be stated that the passages may either be left clear or filled with porous material. Thus in the construction of Figure 1 they may be left open, as shown, or packed with porous material. In the case of Figures 3 to 6, inclusive, the packing material may be omitted, as well as in the case of the structure of Figure 7. These blocks are arranged in tiers on a suitable foundation so as to form a plurality of rectangular vertical passages 15 through which the air may flow. Sound projected upwardly through these passages is, as before, subjected to dissipation by absorption through multiple reflection. To increase the action of multiple reflection the blocks 14' may be constructed as indicated in Figure 8 and shown in Figure 9, that is, the side walls of the blocks may be moved out of parallel relationship as indicated by the broken lines in Figure 8. The blocks 14' may be provided with vertical passages 15'. These passages may be left open, as indicated in this figure. If desired these passages may extend horizontally through the walls of the sound absorbing material in a manner similar to the arrangement of Figure 1. When the blocks 14' of Figure 8 are stacked in tiers in a manner similar to the construction of Figure 7 the result is as illustrated in Figure 9. The inclined side walls 17 of the blocks form the shoulders 18 to cause sound wave turbulence. It has been indicated in Figure 9 that the passages 15' may be filled with sound absorbing material, as indicated at 15''.

Figures 10 to 12, inclusive, show a construction somewhat similar to that of Figure 7 but illustrate a different manner of stacking the blocks. In this case the porous blocks 19 have been shown without passages for the purpose of illustrating this possible modification. The blocks are moulded with what may be termed rabbets 19' to provide spaces for the supporting angle irons 20 at the points where the blocks are unsupported to form the horizontal openings 21 in the vertical partition walls resulting from the stacking of the blocks 19 in the manner illustrated in Figure 10. This construction mainly differs from that of Figure 7 in that the portion of the sound which travels more or less horizontally will in some regions not encounter the porous material but will travel through the horizontal openings 21 to increase the path of their travel in a direction which is more or less at right angles to the vertical axis of the tower or the horizontal axis of the tunnel. Thus these openings contribute to an increase in the length of path of travel of the sound waves, thereby facilitating their attenuation by longer exposure to the sound absorbing media.

In the construction of Figures 13 to 15, inclusive, the blocks 22 are cast of porous material in the form of open rectangles having parallel faces on the top and bottom but inclined faces on the sides and ends, both on the outside and the inside, as is apparent from Figures 14 and 15. These blocks 22 may be stacked in a number of ways, one of which is indicated in these figures. When so stacked they form vertical passages 23 and horizontal passages 24. When a tower is filled with a labyrinth of this type it will be seen that the object of the invention of providing sufficient cross-sectional area for sound travel is accomplished and at the same time multiple reflection and rapid sound absorption is ensured.

In the construction of Figures 16 and 17 the porous blocks 25 are again of generally open rectangular form. In this case their outer faces are all vertical, with opposite pairs parallel, but the inner faces are inclined as indicated in Figure 17. Thus when the blocks are stacked they form the impeding shoulders 28'. The outer faces of the blocks are formed at the corners with shoulders 26 which produce wide, shallow channels on all faces. Thus when the blocks are assembled as indicated in Figure 16 vertical spaces result which are packed with sound absorbing material as indicated at 27.

The constructions of Figures 18 and 19 show modifications of the construction of Figures 16 and 17. In Figure 18 the blocks 28 are hexagonal in cross-section. They are provided with passages therethrough in the form of truncated cones, flaring outwardly in an upward direction as indicated in the figure. The outer faces are formed with shallow half-channels so that when they are assembled vertical passages 29 are formed which are filled with a suitable sound absorbing material 30. With this construction a tunnel or tower is provided with a plurality of circular flues through which the air may travel as well as the sound waves. The sound waves are caused to have multiple reflection and shoulders will be formed because of the conical form of the passages, which shoulders face downwardly with respect to the direction of travel of the sound. The construction of Figure 19 is quite similar to that of Figure 18 but the alternate faces of the blocks 30' are of different widths so that they can be assembled to form vertical flues 31 between them which are, of course, in addition to the vertical flues within the blocks. As before, the contacting walls of the blocks are so shaped as to form small vertical passages which are packed with sound absorbing material, as shown at 32.

Figures 20, 21:
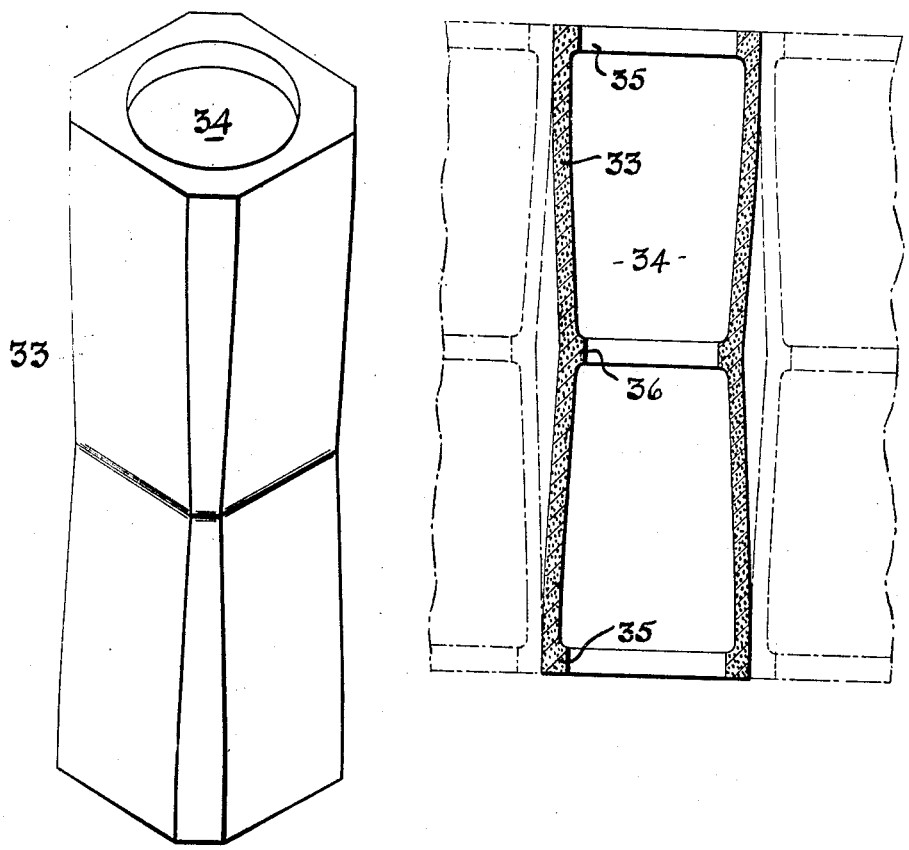
Figure 20 illustrates a final modified form of element.
Figure 21 is a vertical, central, cross-sectional view of the element of Figure 20, showing its relationship to other similar elements when associated into a structure in accordance with this invention.
Figure 22:
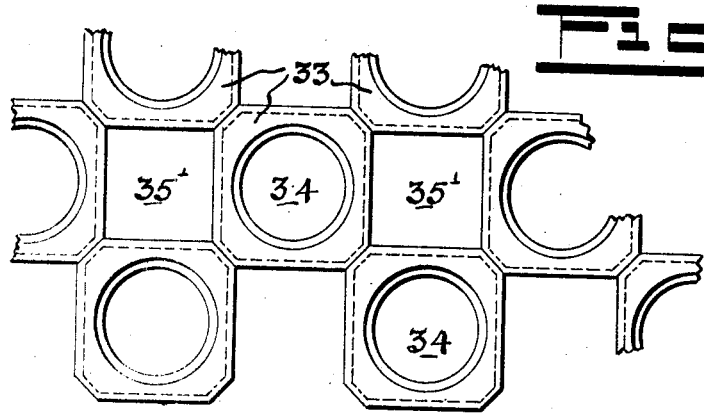
Figure 22 is a top plan view of a structure resulting from the assembly of several of the elements of Figure 20.

Figures 20 to 22, inclusive, show the final form of block as illustrated herein. In this case the blocks 33 are relatively long and have alternate faces which are wider than the intermediate faces. The wider faces are composed of areas which converge towards the center as shown. In the same way the narrow faces converge towards the center. The blocks have large passages 34 therethrough so that, in effect, thin porous walls are formed, as clearly indicated in Figure 21. The inner walls also flare and meet at a central cylindrical projecting portion 36. The outer ends of the tubular block have shoulders, as indicated at 35. The walls of the tubular block are sufficiently thin and porous so that a large percentage of the sound passes through them and is dissipated by reflection facilitated by the inclined walls and dissipated by eddies caused by the shoulders 35 and 36. When a plurality of these tubular blocks are assembled, as indicated in Figure 21, additional spaces are formed in which the sound may be dissipated. These tubular blocks are assembled into a partition, as indicated in Figure 2, so that they create vertical passages 35' which together with the passages 34 are relatively unobstructed for movement of cooling air to and from the testing room.

A number of variants of this invention have been illustrated herein to indicate the large number of physical forms which the sound absorbing materials may take to produce the functions of the structure of this invention. I do not desire to be strictly limited to the form of the invention herein disclosed because they are only indicative of the many ways in which the invention may be accomplished. I prefer, therefore, to be limited by the scope of the claims granted me.

What I claim is:

1. A sound absorbing and dissipating construction, comprising a plurality of spaced partitions composed of porous sound absorbing walls defining passages, said units being arranged so as to align their passages, said passages having ledges to impede the movement of sound waves therethrough.

2. An acoustical construction to be placed in the path of sound waves so as to absorb and dissipate the energy thereof, comprising a stacked mass of hollow porous blocks arranged to form interior and exterior open passages, the walls of the passages being non-planar.

3. An acoustical construction to be placed in the path of sound waves so as to absorb and dissipate the energy thereof, comprising a labyrinth of stacked porous blocks arranged to form open passages, the walls of the passages having sound impeding ledges.

4. An acoustical construction for dissipating sound energy, consisting of a stacked mass of porous blocks, said blocks having parallel top and bottom faces and converging side faces, the stacked blocks in said mass forming passages.

5. In an acoustical construction for dissipating the energy of sound waves, the combination including a stacked mass of hollow porous blocks, said blocks being stacked to align the passages therethrough and having non-planar outer faces forming spaces therebetween.

6. In an acoustical construction for dissipating the energy of sound waves, the combination including a stacked mass of porous blocks, said blocks being formed with passages therethrough and having contacting outer faces to form spaces therebetween, and the passages through the blocks having projecting sound impeding shoulders.

7. A sound absorbing structural unit comprising a body of porous material having at least one passage therethrough, said body having a polygonal cross-section and parallel ends, and outer side faces lying at oblique angles to said ends.

8. A sound absorbing structural unit comprising a body of porous material having at least one passage therethrough, said body having a polygonal cross-section and parallel ends, outer side faces lying at oblique angles to said ends, and inner walls defining said passage having at least one circumferential ridge forming an annular shoulder.

9. A sound absorbing structural member comprising a shaped body of porous material, said body having a polygonal cross-section and parallel ends, the outer defining walls of said body being inclined from each end of the body towards the central axis of the body.

10. A sound absorbing structural member comprising a shaped body of porous material, said body having a polygonal cross-section and parallel ends, the outer defining walls of said body being inclined from each end of the body towards the central axis of the body, said body having a longitudinal passage likewise defined by walls inclined towards the central axis of the body.

11. A sound absorbing structural member comprising a shaped body of porous material, said body having a polygonal cross-section and parallel ends, the outer defining walls of said body being inclined from each end of the body towards the central axis of the body, said body having a longitudinal passage likewise defined by walls inclined towards the central axis of the body, the interior inclined walls terminating in circumferential shoulders.

12. In an acoustical construction for dissipating the energy of free sound waves in air in a confined channel while providing a substantial cross-sectional area of the channel for the movement of air therethrough, comprising stacked masses of porous, hollow masonry blocks, the defining walls of said blocks converging from one end toward the other and the blocks being stacked to align them to form tortuous passages.

13. In an acoustical construction for dissipating the energy of free sound waves in air in a confined channel while providing a substantial cross-sectional area of the channel for the movement of air therethrough, comprising stacked masses of porous, hollow, cementitious masonry blocks, the defining wall of said blocks converging from one end toward the other and the blocks being stacked to form tortuous passages interiorly and exteriorly of the stacks.

14. An acoustical construction to be placed in the path of free sound waves in the air so as to absorb and dissipate the energy thereto, comprising a labyrinth of stacked, cementitious, porous blocks arranged to form open passages, the walls of the passages having sound impending ledges comprising the side faces of said blocks.

15. An acoustical construction for dissipating sound energy consisting of stacked masses of porous cementitious blocks, said blocks having parallel top and bottom faces and converging side faces, the stacked blocks in said masses forming tortuous passages.

16. An acoustical construction to be placed in the path of sound waves free in air so as to absorb and dissipate the energy thereof, comprising a stacked mass of hollow, porous blocks, arranged to form interior and exterior open, tortuous sound dissipating passages.

VICTOR JACOBSON.